United States Patent Office 3,068,716
Patented Dec. 18, 1962

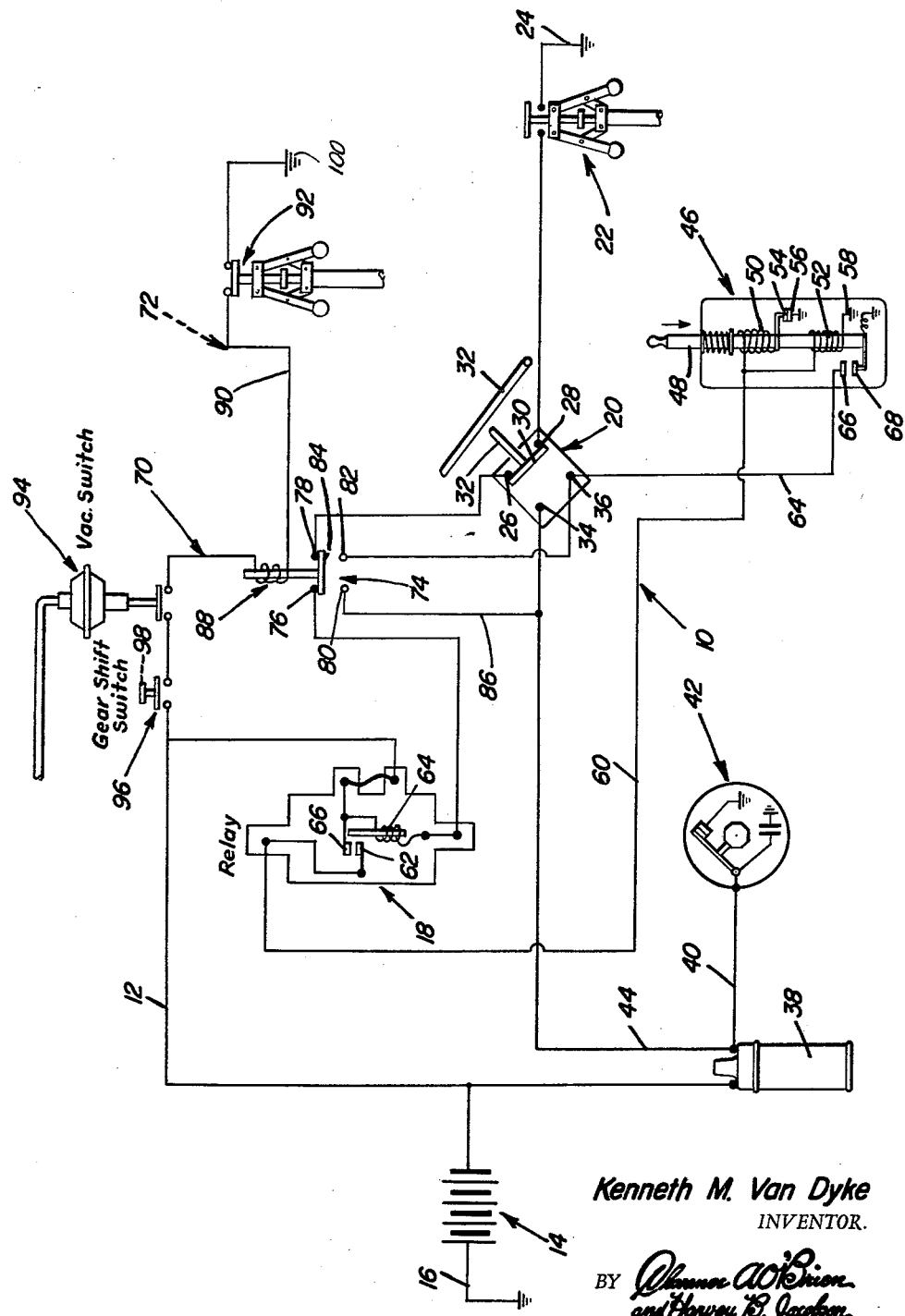

3,068,716
AUTOMATIC KICK DOWN ASSEMBLY FOR
OVERDRIVE TRANSMISSION
Kenneth M. Van Dyke, Forest Grove, Oreg.
(Rte. 2, Box 6E, Cornelius, Oreg.)
Filed Jan. 5, 1961, Ser. No. 80,848
9 Claims. (Cl. 74—472)

This invention relates to a new and useful automatic kick down control assembly for overdrive control systems, and more specifically to an automatic kick down control system specifically adapted to enable an overdrive transmission to not only be actuated from overdrive operation to a lower gear ratio upon the depression of the accelerator pedal to its downward limit position, but also at any time when the gear shift lever of the vehicle is in the third gear position, when the vehicle is traveling at speeds above a predetermined speed of approximately 45 miles per hour and when the engine of the vehicle is under heavy load without the accelerator pedal being completely depressed.

This is a continuation-in-part application of my prior copending application Serial No. 694,563, filed November 5, 1957 for Automatic Kick Down Assembly for Overdrive Transmission now abandoned.

Many types of vehicles are provided with overdrive transmissions in order to lower the engine speed while the vehicle is traveling at high speeds so as to increase the efficiency of the vehicle. However, when the overdrive gear ratio is used and the speed of the vehicle is permitted to fall below a certain minimum, the load on the engine of the vehicle becomes excessive at that engine speed inasmuch as the efficiency and power of the engine is not high at low engine speeds and as a result the efficiency of the vehicle drops off greatly. In addition to a reduction in economy and efficiency, the overloading of the engine at low speeds results in both a build-up of carbon in the combustion chambers but also places excessive stresses on the bearings of the engine. It is therefore highly desirable that there be provided some type of automatic kick down control system which would operate to kick down the overdrive transmission to the lower gear ratio thereof when the vehicle is traveling at a speed slower than a predetermined speed establishing a lower limit of efficiency of the engine when the vehicle is in third gear and when a load is placed on the engine.

It is therefore the main object of this invention to provide an automatic kick down control system which may be incorporated into existing control systems for overdrive transmissions which will automatically operate at such times as it is desirable in order to provide the lower gear ratio of the overdrive transmission when the vehicle is in third gear, when it is traveling at a rate below a predetermined speed and when an excessive load is placed on the engine.

Another object of this invention is to provide an automatic kick down control system for overdrive transmissions which may be automatically operated by a reduction in the vacuum in the intake manifold of the engine of the vehicle in response to a heavy load being placed on the engine.

A further object of this invention is to provide an automatic kick down control system for overdrive transmissions which may be readily mounted on existing vehicles and incorporated in the conventional controls of the overdrive transmission thereof without requiring any changes to those existing controls and requiring only additions to the vehicle.

Still another object of this invention is to provide an automatic kick down control system which will conform to conventional forms of manufacture, be of simple construction and easy to install so as to provide a device that will be economically feasible, long lasting and capable of being installed without necessarily requiring the help of an expert mechanic.

These together with other objects and advantages which will become subsequently apparent reside in the details of construction and operation as more fully hereinafter described and claimed, reference being had to the accompanying drawing forming a part hereof, wherein like numerals refer to like parts throughout, and in which the figure shown is a schematic wiring diagram showing both the existing control for a standard overdrive transmission and the automatic kick down control system of the instant invention, the existing control being shown in solid lines and the automatic kick down control system being shown in dotted lines.

Referring now more specifically to the drawing there will be seen the basic components of an overdrive control system for a standard overdrive transmission, the control system being referred to in general by the reference numeral 10.

The control system 10 includes a main electrical supply line 12 which extends from a battery generally referred to by the reference numeral 14 and has a ground wire 16 and an overdrive relay generally referred to by the reference numeral 18.

Also disposed in the main electrical supply line 12 is a double pole double throw kick down switch generally referred to by the reference numeral 20 and a speed actuated governor switch generally referred to by the reference numeral 22 having a ground 24. The double pole double throw kick down switch 20 includes first and second contacts 26 and 28 normally bridged by a bridging element 30. The accelerator pedal 32 of the vehicle in which the overdrive control system is disposed is mounted for engagement with the shank 32 of the bridging element to move the latter from engagement with the contacts 26 and 28 and into engagement with third and fourth contacts 34 and 36.

The main electrical control wire 12 is also connected to the coil 38 of the vehicle engine and a first coil wire 40 extends to the distributor generally referred to by the reference numeral 42. A second coil wire 44 extends from the first coil wire 40 to the third contact 34 of the double pole double throw switch 20. An overdrive solenoid generally referred to by the reference numeral 46 is provided and includes a movable armature 48 and an actuating coil 50 and a holding coil 52. The actuating coil 50 is provided with a movable contact 54 engageable with the ground contact 56 upon retraction of the armature 48 and the holding coil 52 is provided with a permanent ground 58. An actuating wire 60 extends between the relay contact 62 of the relay 18 and the actuating and holding coils 50 and 52. A ground wire 64 is connected between the fourth contact 36 of the double pole double throw kick down switch 20 and a stationary contact 66 which is engageable by a movable ground contact 68 carried by the armature 48 upon movement of the solenoid armature 48 to the applied position. The relay 18 includes an electromagnetic actuator 64 for moving a movable contact 66 into engagement with the contact 62 in order to connect the actuating wire 60 with the main electrical wire 12 to actuate the actuating and holding coils 50 and 52.

The structure hereinbefore referred to comprises a part of a conventional overdrive control system and it is therefore deemed unnecessary to more specifically set forth this structure inasmuch as it is to be used only in conjunction with the present invention and its operation will hereinafter be more fully set forth.

The automatic kick down control system of the instant invention is generally designated by the reference numeral 70 and includes a supplemental circuit referred to in general by the reference numeral 72. The supplemental circuit 72 includes a double pole double throw control switch generally referred to by the reference numeral 74 having first and second contacts 76 and 78 respectively disposed in the main electrical wire 12 between the relay 18 and the double pole double throw overdrive kick down switch 20. The control switch 74 also includes third and fourth contacts 80 and 82 respectively and a bridging member 84 normally engaged with the contacts 76 and 78.

A bridging wire 86 is connected between the coil wire 86 and the fourth contact 36 of the kick down switch 20 and has the spaced contacts 80 and 82 disposed therein. The bridging element 84 is connected to an electromagnetic actuator generally referred to by the reference numeral 88 which is disposed in the control wire 90 of the control circuit 72. The control wire 90 also includes a speed actuated auxiliary governor switch generally referred to by the reference numeral 92 which is set to close at speeds above approximately 45 miles per hour. Additionally, the control wire 90 has an engine vacuum actuated switch generally referred to by the reference numeral 94 disposed therein and a gear shift lever actuated switch generally referred to by the reference numeral 96 disposed therein having an abutment head 98 engageable by the gear shift lever of the vehicle to close the switch 96. Further, the control wire 90 includes a ground 100. It is to be understood that the engine vacuum actuated switch 94 is set to close at a relatively low vacuum setting.

In operation, when the vehicle speed reaches the cut in point of the governor 22 which is approximately 27 miles per hour, the governor switch 22 closes and completes the circuit of the main electrical control wire from the battery 14 to the ground 24 inasmuch as the bridging member 84 is normally disposed in the closed position engaged with contacts 76 and 78 and the bridging element 30 is normally disposed in engagement with the contacts 26 and 28. The resultant current flow through the main electrical control wire 12 energizes the relay electromagnetic actuator 64 which closes the relay contacts 62 and 66 completing the circuit between the battery 14 and the actuating and holding coils 50 and 52. Energized by a heavy current flow, the actuating coil 50 moves the solenoid armature 48 to the apply position in a direction opposite to that indicated by the arrow in the drawing and against the actuating mechanism of the overdrive transmission. The actuating mechanism of the overdrive transmission is spring loaded and may not actuate the overdrive transmission to move out of the overdrive position until the torque of the engine is released.

As the actuating coil 50 completes the movement of the armature 48 it opens the grounding contacts 54 and 56 of the actuating coil 50 by moving the contact 54 away from the contact 56. Inasmuch as the holding coil 52 remains connected to the battery, the armature is held in the apply position once it has been moved there by the actuating coil 50. When the torque of the engine is released the spring loaded actuator actuated by the armature 48 actuates the overdrive transmission to the lower gear ratio.

When the accelerator pedal 32 is depressed to simultaneously move the bridging element 30 from engagement with the contacts 26 and 28 and into engagement with the contacts 34 and 36 the first coil wire 40 is grounded by means of the coil wire 44 and the grounding wire 64 by means of the closed contacts 66 and 68 which have been closed by movement of the armature 48 to the apply position. Inasmuch as the bridging element 30 has opened the circuit to the holding coil 52, the spring loaded actuator for the overdrive transmission moves the armature 48 of the solenoid 46 in the direction indicated by the arrow in the drawing to effect overdrive operation of the overdrive transmission while at the same time moving the contact 68 from engagement with the contact 66 thereby removing the direct ground for the first coil wire 40. It is necessary that the first coil wire 40 be directly grounded in order to release the torque of the engine so that the spring loaded actuator can move the armature 48 in the direction of the arrow in the drawing in order to return the overdrive transmission to low ratio operation.

With the automatic kick down control system 70 connected to the overdrive control system 10 whenever the speed of the vehicle is in excess of 45 miles per hour the governor switch 92 is closed and if the gear shift lever is in the third gear position the gear shift actuated switch 96 is closed. Accordingly, as soon as the engine vacuum drops to a predetermined level the engine vacuum actuated switch 94 is closed thus energizing the electromagnetic actuator 88 to simultaneously move the bridging member 84 out of engagement with the contacts 76 and 78 and into engagement with the contacts 80 and 82 in the bridging wire 86. Thus, the circuit to the relay is interrupted which opens the circuit to the holding coil when the armature 48 is in the apply position and bridges the second coil wire 44 and the ground wire 64 whereby the first coil wire 40 will be directly grounded by means of the contacts 66 and 68 to momentarily interrupt the torque of the engine thereby enabling the spring loaded actuator of the overdrive transmission to urge the armature 48 in the direction indicated by the arrows in the drawing which will in turn eliminate the direct grounding of the first coil wire 40 and enable the engine to again function to deliver torque to the overdrive transmission but in the meantime the overdrive transmission has been actuated to the higher gear ratio desired when the speed of the vehicle is in excess of 45 miles per hour, the gear shift lever is in the third gear position and the engine vacuum has decreased to a predetermined level.

It is to be appreciated that the electromagnetic actuator 88 could also be manually operated if desired and that the gear shift switch 96 could either be omitted or bridged as desired. In addition, the setting of the speed actuated governor switch 92 may be adjusted as desired.

From the foregoing description of the automatic kick down control system 70 it will be readily apparent that it may be mounted in existing vehicles and incorporated in the overdrive control systems thereof without modifying the overdrive control system other than inserting the contacts 76 and 78 of the double pole double throw switch 74 in the main electrical wire 12 thereof. Further, the automatic kick down control system may be incorporated in existing overdrive control systems with a minimum amount of effort. The operation of the automatic kick down control system 70 is completely automatic and when the load on the engine becomes excessive during the time that the vehicle is in third gear and its speed is in excess of 45 miles per hour the automatic kick down control system 70 will actuate the overdrive transmission to its higher gear ratio.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a motor vehicle including an ignition coil, a gear shift lever, a source of engine vacuum, and an overdrive control system of the type including a main electrical supply line, an overdrive relay, a double pole double throw overdrive kick down switch including first and second contacts normally engaged by a bridging element and a vehicle speed governor switch having a ground disposed in said main electrical supply line, said double pole switch including third and fourth contacts engageable by said bridging element, an ignition coil shorting conductor connected to said third contact, an actuating solenoid having an actuating coil with a movable ground contact, a holding coil with a permanent ground, and movable shorting ground contact, a ground conductor connected between said fourth contact and said actuating solenoid for engagement with said movable coil shorting ground contact, and an actuating shorting conductor connected between said relay and said actuating and holding coils; an automatic kick down control system comprising a supplemental circuit including a bridging conductor connected between said ignition coil shorting conductor and ground conductor, a double pole double throw control switch having first and second contacts disposed in said main line between the first mentioned ground and said overdrive relay, third and fourth contacts disposed in said bridging conductor and a bridging member normally engaged with said first and second control switch contacts and engageable with the third and fourth contacts thereof.

2. The combination of claim 1, wherein said supplemental circuit includes a control conductor connected to said main line and extending to a ground, an electromagnetic actuator in said control conductor connected to said bridging member for moving the latter into engagement with the third and fourth contacts of said control switch, and a vehicle speed controlled governor switch in said control conductor.

3. The combination of claim 1, wherein said supplemental circuit includes a control conductor connected to said main line and extending to a ground, an electromagnetic actuator in said control conductor connected to said bridging member for moving the latter into engagement with the third and fourth contacts of said control switch, and a vehicle engine vacuum actuated switch in said control conductor.

4. The combination of claim 1, wherein said supplemental circuit includes a control conductor connected to said main line and extending to a ground, an electromagnetic actuator in said control conductor connected to said bridging member for moving the latter into engagement with the third and fourth contacts of said control switch, and a gear shift lever actuated switch in said control conductor.

5. The combination of claim 4, including actuator means for said gear shift lever actuated switch for closing the latter only when said gear shift lever is in third gear position.

6. The combination of claim 1, wherein said supplemental circuit includes a control conductor connected to said main line and extending to a ground, an electromagnetic actuator in said control conductor connected to said bridging member for moving the latter into engagement with the third and fourth contacts of said control switch, a vehicle speed controlled governor switch in said control conductor, said vehicle speed controlled governor switch being set to be closed below a vehicle speed of 45 miles per hour.

7. The combination of claim 1, wherein said supplemental circuit includes a control conductor connected to said main line and extending to a ground, an electromagnetic actuator in said control conductor connected to said bridging member for moving the latter into engagement with the third and fourth contacts of said control switch, a vehicle speed controlled governor switch in said control conductor, vehicle engine vacuum actuated switch in said control conductor and a gear shift lever actuated switch in said control conductor.

8. The combination of claim 7, including actuator means for said gear shift lever actuated switch for closing the latter only when said gear shift lever is in third gear position.

9. The combination of claim 8, said vehicle speed controlled governor switch being set to be closed below a vehicle speed of 45 miles per hour.

References Cited in the file of this patent

UNITED STATES PATENTS

| | | |
|---|---|---|
| 2,281,916 | Claytor | May 5, 1942 |
| 2,366,253 | Griswold | Jan. 2, 1945 |
| 2,366,254 | Paton | Jan. 2, 1945 |
| 2,375,816 | Orr | May 15, 1945 |
| 2,587,892 | Price | Mar. 4, 1952 |
| 2,940,336 | Simpson et al. | June 14, 1960 |
| 2,947,192 | Prather | Aug. 2, 1960 |